US008843258B2

(12) United States Patent
Katono et al.

(10) Patent No.: US 8,843,258 B2
(45) Date of Patent: Sep. 23, 2014

(54) BATTERY UNIT HEATING APPARATUS

(75) Inventors: Yoshihisa Katono, Saitama (JP);
Takashi Ogane, Saitama (JP); Yuji Fujita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 546 days.

(21) Appl. No.: 13/130,999

(22) PCT Filed: Oct. 29, 2009

(86) PCT No.: PCT/JP2009/068623
§ 371 (c)(1),
(2), (4) Date: Aug. 10, 2011

(87) PCT Pub. No.: WO2010/064509
PCT Pub. Date: Jun. 10, 2010

(65) Prior Publication Data
US 2011/0288708 A1  Nov. 24, 2011

(30) Foreign Application Priority Data
Dec. 3, 2008  (JP) ............................. P.2008-308691

(51) Int. Cl.
| B60W 10/30 | (2006.01) |
| B60W 10/08 | (2006.01) |
| B60W 20/00 | (2006.01) |
| B60K 11/06 | (2006.01) |
| B60K 1/04 | (2006.01) |
| B60K 6/48 | (2007.10) |
| B60L 3/00 | (2006.01) |
| B60L 11/14 | (2006.01) |
| B60L 11/18 | (2006.01) |
| B60K 1/00 | (2006.01) |

(52) U.S. Cl.
CPC ............... *B60K 11/06* (2013.01); *B60W 10/08* (2013.01); *B60K 1/04* (2013.01); *B60K 6/48* (2013.01); *B60K 2001/005* (2013.01); *B60K 2001/008* (2013.01); *B60L 3/0046* (2013.01); *B60L 11/14* (2013.01); *B60L 11/187* (2013.01); *B60L 11/1874* (2013.01); *B60L 11/1875* (2013.01); *B01L 11/1877* (2013.01); *B60L 2240/445* (2013.01); *B60W 2510/0676* (2013.01); *B60W 2510/246* (2013.01); *B60W 2520/10* (2013.01); *B60W 2710/246* (2013.01); *Y02T 10/6221* (2013.01); *Y02T 10/7005* (2013.01); *Y02T 10/705* (2013.01); *Y02T 10/7077* (2013.01); *Y10S 903/903* (2013.01)
USPC ............................................ 701/22; 903/903

(58) Field of Classification Search
USPC ......... 701/22, 36; 180/65.265, 65.275, 65.29, 180/68.1, 68.2, 68.3; 165/43, 202; 903/903
See application file for complete search history.

(56) References Cited

U.S. PATENT DOCUMENTS 5,490,572 A * 2/1996 Tajiri et al. .................... 180/65.1
5,624,003 A * 4/1997 Matsuki et al. ............... 180/65.1

(Continued)

FOREIGN PATENT DOCUMENTS

| JP | 9-275601 A | 10/1997 |
| JP | 10-297570 A | 11/1998 |

(Continued)

OTHER PUBLICATIONS

Chinese Office Action, Application No. 200980147286.3, May 6, 2013.

*Primary Examiner* — Jason Holloway
(74) *Attorney, Agent, or Firm* — Westerman, Hattori, Daniels & Adrian, LLP (57) ABSTRACT

A battery unit heating apparatus installed in a vehicle which can drive by power from at least one of an internal combustion engine and an electric motor which is driven by a battery unit as a power supply, includes: an induction unit for drawing in air for heating the battery unit; and an induction control unit for controlling the induction unit, when a temperature of the battery unit is lower than a first predetermined value, so as to generate a drawing force larger than a drawing force resulting when the vehicle is set to the other mode of two modes having different drive ratios of the internal combustion engine to the electric motor while the vehicle is running in such a state that the vehicle is set to one of the two modes in which the electric motor is employed more positively than the internal combustion engine.

7 Claims, 10 Drawing Sheets

(56) References Cited

U.S. PATENT DOCUMENTS

| | | | |
|---|---|---|---|
| 5,730,237 A * | 3/1998 | Matsuki et al. | 180/65.1 |
| 5,839,656 A * | 11/1998 | Yamano et al. | 237/12.3 B |
| 6,575,258 B1 * | 6/2003 | Clemmer | 180/68.5 |
| 6,902,020 B2 * | 6/2005 | Kronner et al. | 180/68.5 |
| 7,631,711 B2 | 12/2009 | Kubo | |
| 7,678,494 B2 | 3/2010 | Tsuchiya | |
| 7,810,596 B2 | 10/2010 | Tsuchiya | |
| 7,900,727 B2 | 3/2011 | Shinmura | |
| 8,127,564 B2 | 3/2012 | Takamatsu et al. | |
| 8,215,432 B2 * | 7/2012 | Nemesh et al. | 180/68.2 |
| 2005/0011692 A1 * | 1/2005 | Takahashi et al. | 180/68.5 |
| 2007/0289789 A1 | 12/2007 | Tsuchiya | |
| 2007/0292752 A1 | 12/2007 | Tsuchiya | |
| 2008/0078542 A1 * | 4/2008 | Gering et al. | 165/202 |
| 2008/0257624 A1 | 10/2008 | Kubo | |
| 2009/0260905 A1 | 10/2009 | Shinmura | |
| 2010/0050676 A1 | 3/2010 | Takamatsu | |

FOREIGN PATENT DOCUMENTS

| | | |
|---|---|---|
| JP | 2004-336832 A | 11/2004 |
| JP | 2005-47489 A | 2/2005 |
| JP | 2005-063682 A | 3/2005 |
| JP | 2005-204481 A | 7/2005 |
| JP | 2006-121786 A | 5/2006 |
| JP | 2006-151039 A | 6/2006 |
| JP | 2007-282315 A | 10/2007 |
| JP | 2008-52997 A | 3/2008 |
| JP | 2008-278705 A | 11/2008 |
| WO | WO 2008/096899 A1 | 8/2008 |

* cited by examiner

BATTERY UNIT HEATING APPARATUS

TECHNICAL FIELD

The present invention relates to a battery unit heating apparatus for executing a heating control on a battery unit possessed by a vehicle which installs therein an electric motor and an internal combustion engine according to a mode to which the vehicle is set.

BACKGROUND ART

A vehicle such as an EV (Electric Vehicle) or HEV (Hybrid Electric Vehicle) installs therein a battery unit for supplying electric power to a motor as a drive source. The battery unit is made up of a plurality of battery unit cells which are connected in series. Secondary batteries such as nickel hydrogen batteries or lithium ion batteries are used for the battery cells. The output performance of these secondary batteries depends on temperature, and the output performance is reduced at high temperatures and low temperatures. For example, when a vehicle such as an EV or HEV which installs therein a battery unit made up of secondary batteries is used in a cold region particularly in winter, it is considered that a desired output cannot be obtained because sufficient electric power is not supplied to a motor from the battery unit. Consequently, it is desired that an apparatus for cooling or heating the battery unit is installed in the vehicle.

Figure 10A:
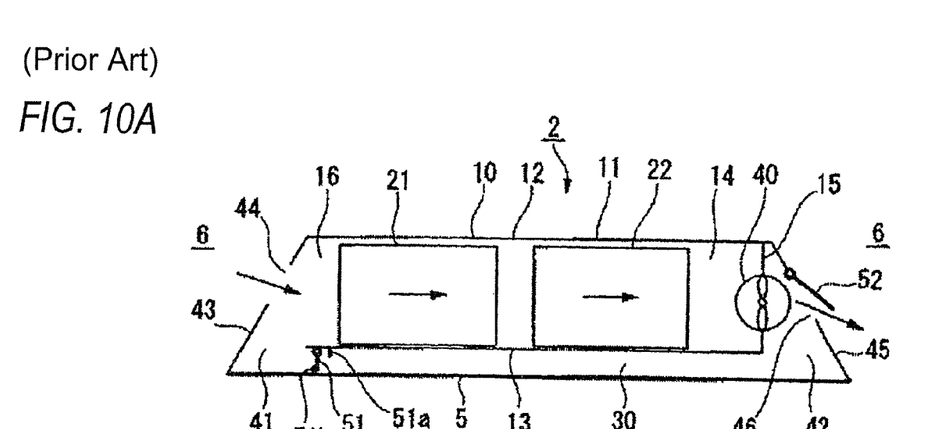
Figure 10B:
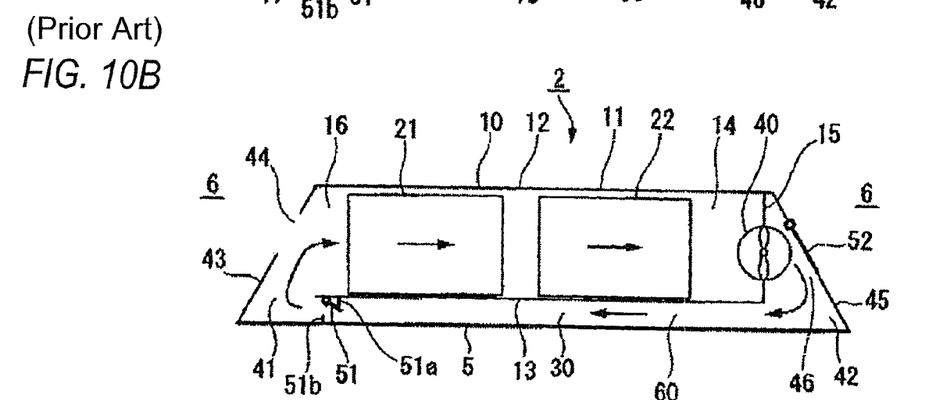

A heating and cooling apparatus for a vehicle electric unit disclosed in Patent Document 1 includes, as is shown in FIG. 10, a vehicle electrical unit 10 which accommodates a battery 21 and an inverter unit 22 in a main air passage, an induction port 44 from which air within a passenger compartment 6 can be introduced into the main air passage 14, a discharge port 46 from which air flowing through the main air passage 14 can be discharged to the outside of the electrical unit 10, an auxiliary air passage 30 that can be connected to and disconnected from the main air passage 14 and which constitutes a closed circuit when connected to the main air passage 14, and a fan 40 which produces a flow of air in the main air passage 14. When cooling the battery 21, air within the passenger compartment 6 is introduced into the main air passage 14 from the induction port 44 and is then discharged from the discharge port 46 after passing from the battery 21 towards the inverter unit 22 as is shown in FIG. 10A. On the other hand, when heating the battery 21, as is shown in FIG. 10B, air is circulated within a closed circuit 60 which is established by connecting the auxiliary air passage 30 to the main air passage 14.

In this heating and cooling apparatus, when a quantity of air which is equal to or larger than a predetermined flow rate flows in the main air passage 14, a first shutter 51 is closed, while a second shutter 52 is closed. On the other hand, when a quantity of air smaller than the predetermined flow rate flows in the main air passage 14, the first shutter 51 is opened, while the second shutter 52 is closed. In this way, the first shutter 51 and the second shutter 52 are opened and closed by a force based on the flow of air flowing through the main air passage 14, their own weights of the shutters and an elastic force of an elastic member.

RELATED ART DOCUMENT

Patent Document

Patent Document 1: JP-A-2005-47489

SUMMARY OF THE INVENTION

Problem that the Invention is to Solve

An EV installs an electric motor only as a drive source, but an HEV installs two drive sources of an electric motor and an internal combustion engine. Consequently, in the HEV, energy required to drive the vehicle can be obtained by driving at least one of the drive sources according to a running condition or a mode set. For example, required energy is obtained by driving both the electric motor and the internal combustion engine when the vehicle is started up or suddenly accelerated, by driving only the electric vehicle when the vehicle cruises at low speeds, and driving only the internal combustion engine when the vehicle cruises at high speeds.

In addition, an HEV is also considered in which a drive ratio of an electric motor to an internal combustion engine is changed in accordance with a mode selected from a plurality of modes. A fuel efficiency preference mode is considered as one of the plurality of modes. In general, an electric motor provides a better fuel economy than an internal combustion engine. Consequently, the HEV which is set to the fuel efficiency preference mode can drive with less fuel consumption.

As has been described above, however, the output performance of a battery unit for supplying electric power to an electric motor depends on temperatures. Because of this, even in the event that the vehicle is set to the fuel efficiency preference mode in such a state that the temperature of the battery unit is low, there can occur such a situation that desired energy required to drive the vehicle cannot be obtained from the electric motor. As this occurs, the battery unit needs to be heated. In the heating and cooling apparatus of Patent Document 1, whether or not the battery 21 needs to be heated is determined based on the temperature of the battery 21. Then, when it is determined that heating is necessary, the fan 40 is driven at a low speed. As this occurs, since air is circulated in the closed circuit 60 in which air is neither drawn from nor discharged to the passenger compartment 6, heat generated in the inverter unit 22 warms up the battery 21 via air.

In the heating and cooling apparatus, the fan 40 is not controlled in accordance with a mode set for the HEV. Namely, even in the event that this heating and cooling apparatus is installed in an HEV which can be set to a plurality of modes, the heating and cooling apparatus heats the battery 21 based on the temperature of the battery 21 whether the vehicle is set to the fuel efficiency preference mode that has been described above or the other mode. Because of this, an apparatus is desired which can execute a heating control on a battery unit based on a mode to which a vehicle is set.

In addition, in the heating and cooling apparatus in Patent Document 1, the heat source used when heating the battery 21 is the inverter unit 22. Heat generated in the inverter unit 22 warms up air, and it is considered that quite a length of time is taken before the battery 21 is heated to a predetermined temperature.

An object of the invention is to provide a battery unit heating apparatus for executing a heating control on a battery unit possessed by a vehicle which installs therein an electric motor and an internal combustion engine in accordance with a mode to which the vehicle is set.

Means for Solving the Problem

With a view to attaining the object by solving the problem, according to an invention according to a first aspect, there is provided a battery unit heating apparatus installed in a vehicle which can drive by power from at least one of an internal combustion engine (for example, an internal combustion engine E in an embodiment) and an electric motor (for example, an electric motor M in the embodiment) which is driven by a battery unit (for example, a battery unit 101 in the embodiment) as a power supply, characterized by comprising an induction unit (for example, an induction fan 115 in the embodiment) for drawing in air for heating the battery unit and an induction control unit (for example, a control unit 125 in the embodiment) for controlling the induction unit, when a temperature of the battery unit (for example, a battery temperature Tb in the embodiment) is lower than a first predetermined value (for example, a second threshold Th2 in the embodiment), so as to generate a drawing force larger than a drawing force resulting when the vehicle is set to the other mode (for example, a normal mode in the embodiment) of two modes having different drive ratios of the internal combustion engine to the electric motor while the vehicle is running in such a state that the vehicle is set to one of the two modes in which the electric motor is employed more positively than the internal combustion engine (for example, a fuel efficiency preference mode in the embodiment).

Further, according to an invention according to a second aspect, there is provided a battery unit heating apparatus as in the first aspect, characterized in that when the temperature of the battery unit is equal to or higher than a second predetermined value (for example, a first threshold Th1 in the embodiment), the induction control unit controls the induction unit so as not to draw in air for heating the battery unit.

Further, according to an invention according to a third aspect, there is provided a battery unit heating apparatus as in the second aspect, characterized in that when the temperature of the battery unit is equal to or higher than the first predetermined value and is less than the second predetermined value, the induction control unit controls the induction unit so as to generate a drawing force equal to the drawing force resulting when the vehicle is set to the other mode even in the event that the vehicle is set to the one mode.

Further, according to an invention according to a fourth aspect, there is provided a battery unit heating apparatus as in the first aspect, characterized by comprising a passenger compartment heating unit (for example, an air conditioner 109 in the embodiment) for heating a space within the passenger compartment of the vehicle by heat generated in the internal combustion engine, and characterized in that the induction unit draws in air for heating the battery unit from the space in the passenger compartment of the vehicle.

Further, according to an invention according to a fifth aspect, there is provided a battery unit heating apparatus as in the fourth aspect, characterized by comprising a cooling water temperature detection unit (for example, a cooling water temperature sensor 121 in the embodiment) for detecting a temperature of cooling water of the internal combustion engine and a vehicle speed detection unit (for example, a vehicle speed sensor 119 in the embodiment) for detecting a running speed of the vehicle, and characterized in that when the temperature of the cooling water of the internal combustion engine detected by the cooling water temperature detection unit is equal to or higher than a predetermined value (for example, a predetermined threshold Th0 in the embodiment), the induction control unit induces a drawing force corresponding to the running speed of the vehicle detected by the vehicle speed detection unit based on a map in which different drawing forces are set in accordance with running speeds of the vehicle even in the event that the vehicle is set to either of the two modes and controls the induction unit so as to generate the drawing force so induced.

Further, according to an invention according to a sixth aspect, there is provided a battery unit heating apparatus as in the first aspect, characterized by comprising a vehicle speed detection unit (for example, a vehicle speed sensor 119 in the embodiment) for detecting a running speed of the vehicle, and characterized in that the induction control unit induces a drawing force corresponding to the running speed of the vehicle detected by the vehicle speed detection unit based on a map in which different drawing forces are set in accordance with running speeds of the vehicle even in the event that the vehicle is set to either of the two modes and controls the induction unit so as to generate a drawing force which is equal to or smaller than the drawing force so induced.

Further, according to an invention according to a seventh aspect, there is provided a battery unit heating apparatus as in the first aspect, characterized in that the one mode or the other mode is set through an operation of the driver of the vehicle.

Further, according to an invention according to an eighth aspect, there is provided a battery unit heating apparatus as in the first aspect, characterized in that the vehicle comprises an internal combustion engine having a drive shaft directly connected to a drive shaft of the electric motor.

Advantage of the Invention

According to the battery unit heating apparatus of the invention in the first through eighth aspects, when the temperature of the battery unit is lower than the first predetermined value and the vehicle is set to the mode in which the electric motor is employed more positively than the internal combustion engine, the battery unit is heated to the desired temperature (the second predetermined value) within a shorter period of time than when set to the normal mode by air drawn in by the induction unit. In this way, the heating control can be executed on the battery unit in accordance with the mode to which the vehicle is set.

BRIEF DESCRIPTION OF THE DRAWINGS

FIGS. 10A and 10B show cross-sectional views of a heating and cooling apparatus for a vehicle electrical unit disclosed in Patent Document 1, of which FIG. 10A shows a state when cooling the electrical unit and FIG. 10B shows a state when heating the same unit.

MODE FOR CARRYING OUT THE INVENTION

Hereinafter, an embodiment of the invention will be described by reference to the drawings. A battery unit heating apparatus of the embodiment which will be described below is installed in an HEV (Hybrid Electric Vehicle) in which an internal combustion engine and an electric motor which is driven by a battery unit as a power supply are provided.

Figure 1:
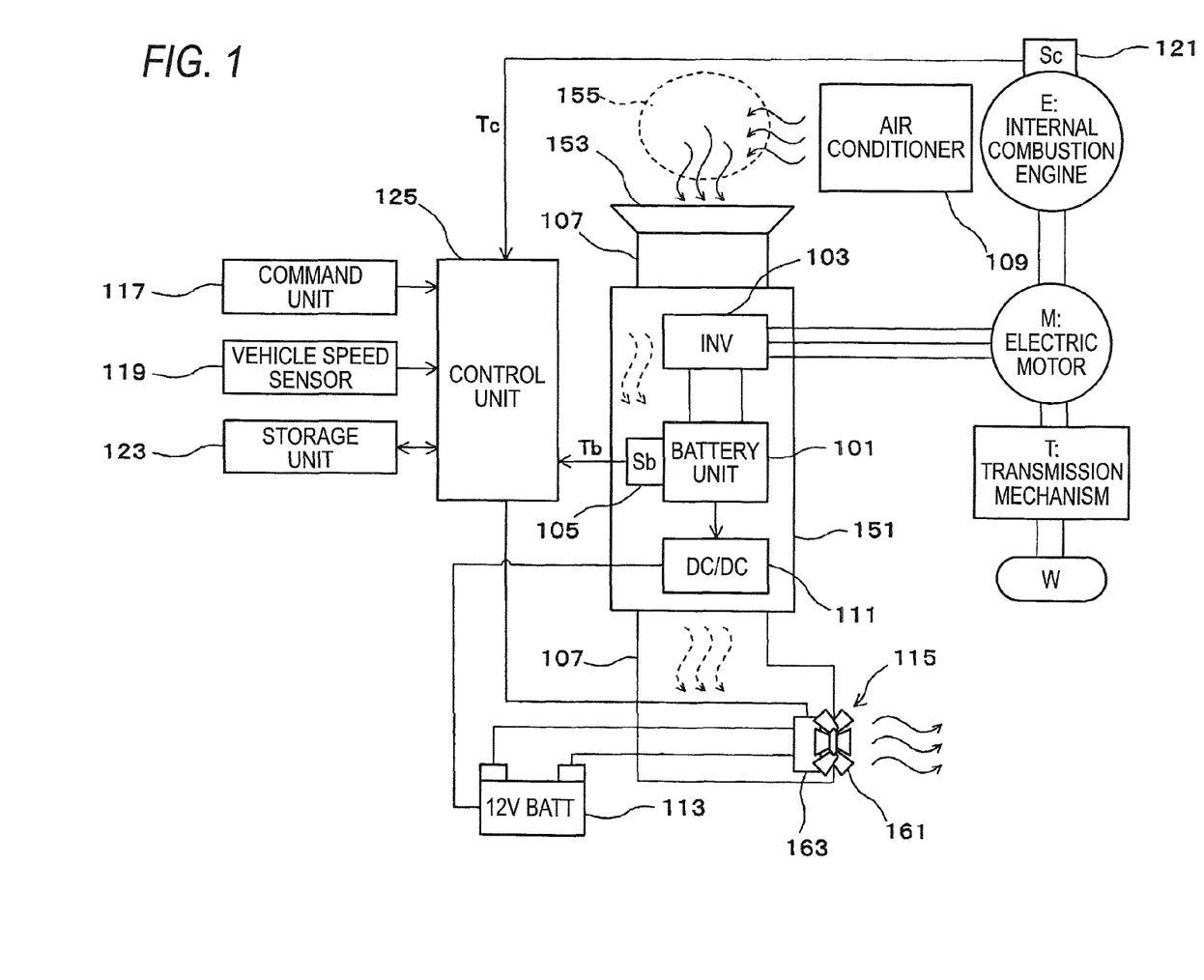
FIG. 1 is a block diagram showing an example of an interior configuration of a vehicle which includes a battery unit heating apparatus of an embodiment according to the invention.

FIG. 1 is a block diagram showing an example of an interior configuration of a vehicle which includes a battery unit heating apparatus of an embodiment according to the invention. A vehicle shown in FIG. 1 mainly includes an internal combustion engine E, an electric motor M, a transmission mechanism T, drive wheels W, a battery unit 101, an inverter (INV) 103, a battery temperature sensor (Sb) 105, an induction duct 107, an air conditioner 109, a DC-DC converter 111, an auxiliary battery unit 113, an air induction fan 115, a command unit 117, a vehicle speed sensor 119, a cooling water temperature sensor (Sc) 121, a storage unit 123 and a control unit 125. An output voltage of the battery unit 101 is a high voltage (for example, 100 to 200V) and an output voltage of the auxiliary battery unit 113 is a low voltage (for example, 12V).

The vehicle shown in FIG. 1 is a parallel hybrid vehicle (hereinafter, referred to simply as a "vehicle") having a construction in which the internal combustion engine E, the electric motor M and the transmission mechanism T are connected in series. In this type of vehicle, drive forces of both the internal combustion engine E and the electric motor M are transmitted to the drive wheels W via the transmission mechanism T. The electric motor M is driven by electric power supplied from the battery unit 101 via the inverter 103.

The battery unit 101 is made up of a plurality of battery cells which are connected in series. Secondary batteries such as nickel hydrogen batteries or lithium ion batteries are used for the battery cells. The inverter 103 converts a direct current voltage from the battery unit 101 into an alternating current voltage to supply the three-phase alternating current to the electric motor M. The battery temperature sensor 105 detects a temperature Tb of the battery unit 101 (hereinafter, referred to as a "battery temperature"). A signal signaling the battery temperature Tb detected by the battery temperature sensor 105 is input into the control unit 125. The battery unit 101, the inverter 103, the battery temperature sensor 105 and the DC-DC converter 111 are integrated into a single unit 151.

Figure 2:
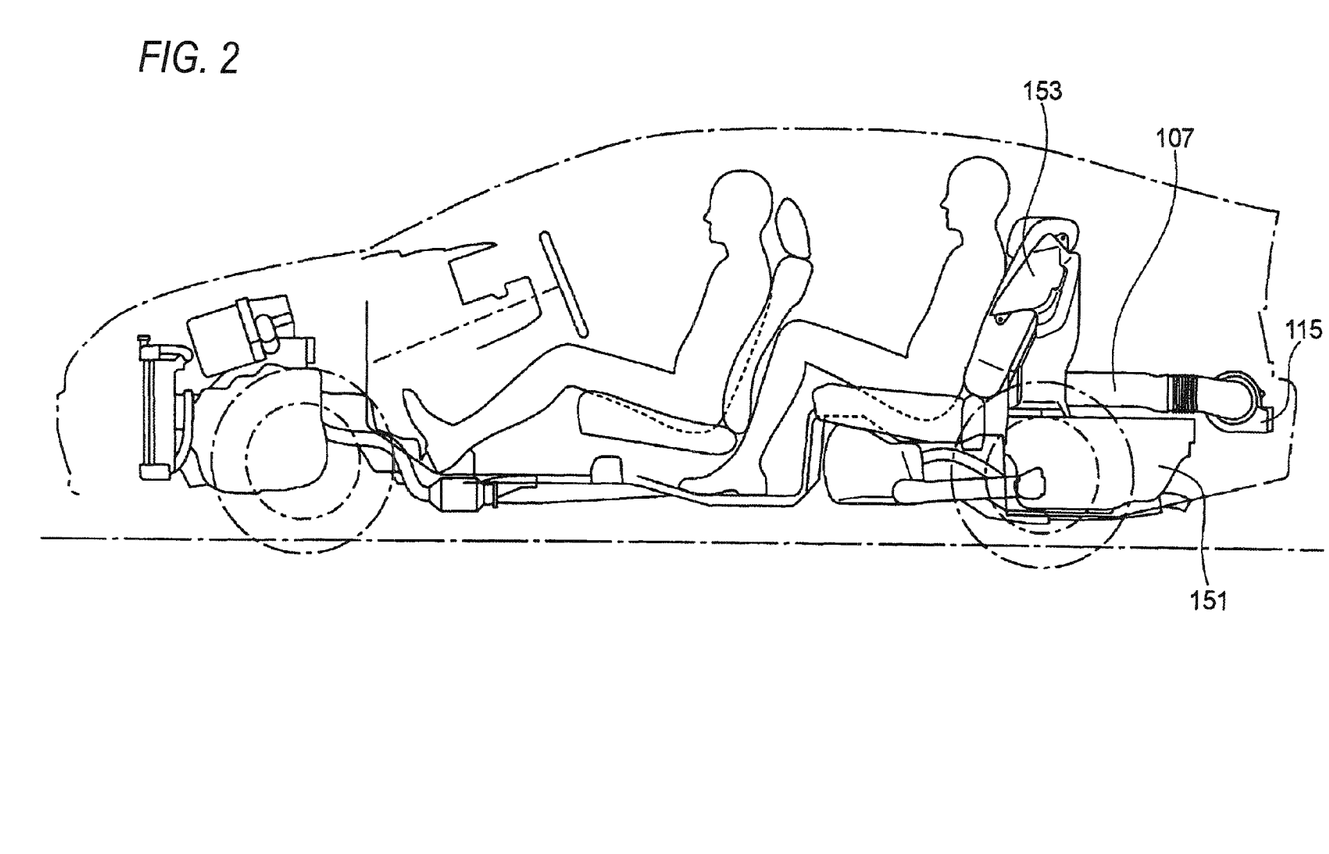
FIG. 2 is a drawing showing where to arrange an induction duct and a unit within the vehicle.
Figure 3:
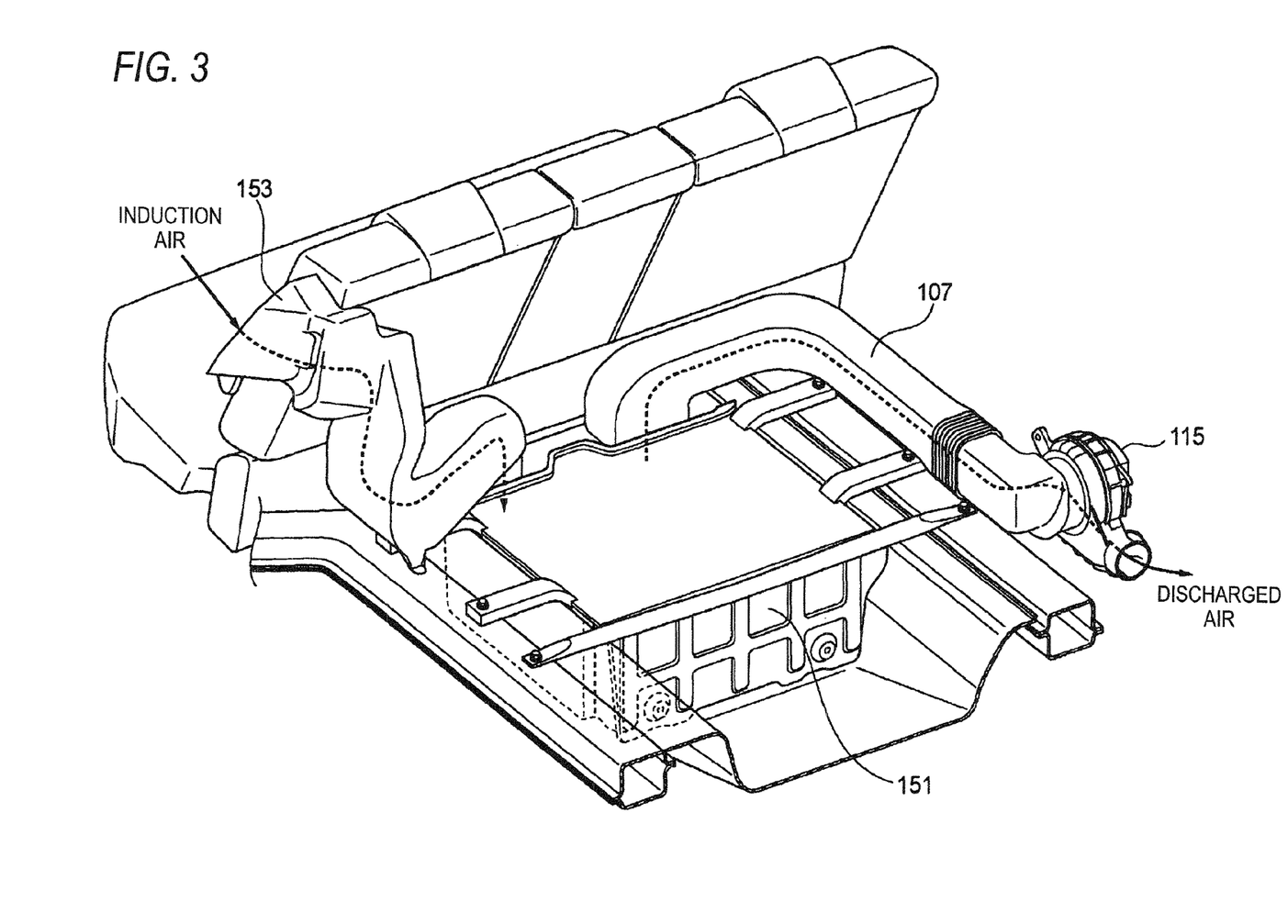
FIG. 3 is a drawing showing where to arrange the induction duct and the unit within the vehicle.
Figure 4:
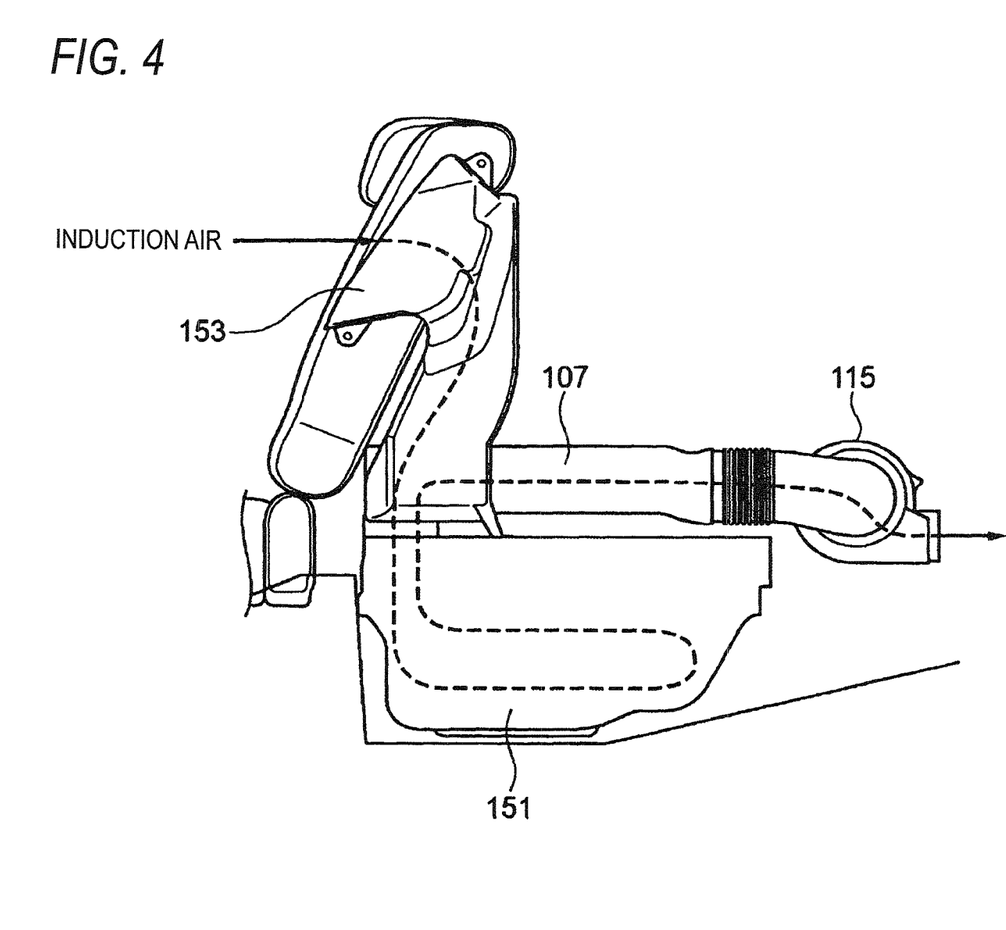
FIG. 4 is a drawing showing where to arrange the induction unit and the unit within the vehicle.

The induction duct 107 forms a passage of air drawn in from an induction port 153. As shown in FIGS. 2 to 4, the induction port 153 is provided by a side of a rear seat of the vehicle. Consequently, air within the passenger compartment is drawn into the induction duct 107. The temperature of a space 155 within the passenger compartment is controlled by the air conditioner provided in the vehicle. Consequently, the temperature of outside air is low, the space 155 within the passenger compartment is warmed up by the air conditioner 109. Note that cooling water for the internal combustion engine E become a heat source of warm air supplied from the air conditioner 109. Thus, in this embodiment, the idling-stop is prohibited.

The unit 151 made up of the battery unit 101, the inverter 103 and the battery temperature sensor 105 is provided in an intermediate position along the length of the induction duct 107. Air that is drawn in from the induction port 153 flows to a discharge port of the induction duct 107 via an interior space of the unit 151. A flow of air flowing in the induction duct 107 and the unit 151 is generated by driving the induction fan 115, which will be described later.

The DC-DC converter 111 drops the output voltage of the battery unit 101 to charge the auxiliary battery unit 113. The induction fan 115 is provided at the discharge port of the induction duct 107. The induction fan 115 has a fan 161 and a motor 163 for driving to rotate the fan 161. The induction fan 115 is driven by electric power being supplied to the motor 163 from the auxiliary battery unit 113. When the induction fan 115 is driven, air within the passenger compartment is drawn into the induction duct 107, whereby a flow of air is generated within the induction duct 107 and the unit 151.

The motor 163 of the induction fan 115 is PWM (Pulse Width Modulation) controlled by the control unit 125. Namely, the control unit 125 controls the rotation speed of the motor by controlling the duty ratio. The drawing force of the induction fan 115 increases when the rotation speed of the motor 163 increases. Because of this, the control unit 125 can control the flow rate of air within the induction duct 107 and the unit 151 by controlling the drawing force of the induction fan 115 by changing the duty ratio.

The command unit 117 outputs to the control unit 125 a signal regarding a mode set which is selected by the driver of the vehicle from two modes having different drive ratios of the internal combustion engine E to the electric motor M while the vehicle is being accelerated or cruising. In this embodiment, the driver can select either a "fuel efficiency preference mode" in which the electric motor M is employed more positively than the internal combustion engine E or a "normal mode" in which the drive ratio of the electric motor M is lower than in the fuel efficiency preference mode.

The vehicle speed sensor 119 detects a running speed of the vehicle (a vehicle speed). A signal signaling the vehicle speed detected by the vehicle speed sensor 119 is input into the control unit 125. The cooling water temperature detection sensor 121 detects a temperature of cooling water in the internal combustion chamber E (hereinafter, referred to as a "cooling water temperature") Tc. A signal signaling the cooling water temperature Tc detected by the cooling water temperature sensor 121 is input into the control unit 125.

Figure 5:
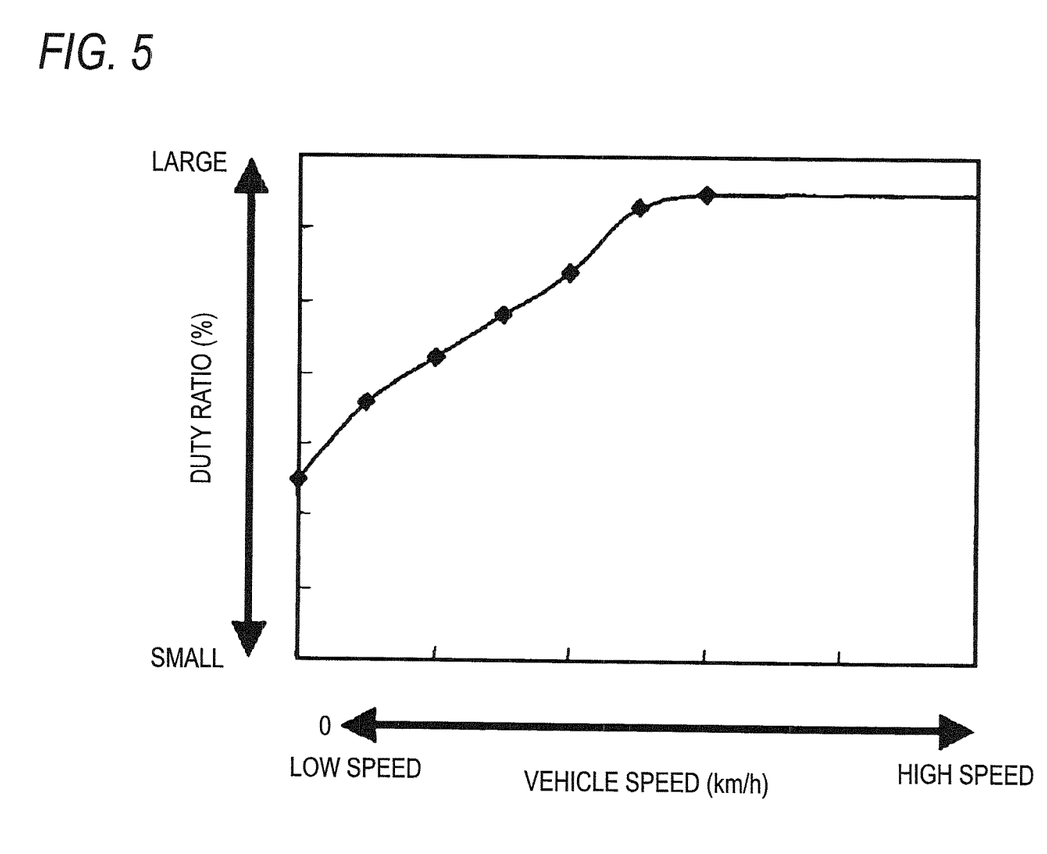
FIG. 5 is a chart showing an example of a relationship between vehicle speed and duty ratio based on a vehicle speed/duty ratio map.

The storage unit 123 stores a map which shows duty ratios with respect to vehicle speeds (hereinafter, referred to as a "vehicle speed/duty ratio map"). Duty ratios set on the vehicle speed/duty ratio map (hereinafter, referred to "limit duty ratios") are set to values which satisfy to a predetermined level the NV (Noise-Vibration) performance which is an evaluation standard of comfortableness for the driver and other occupants in the vehicle. FIG. 5 shows an example of a relationship between vehicle speed and limit duty ratio by the vehicle speed/duty ratio map. Air noise produced by the fan 161 of the induction motor 115 and drive noise of the motor 163 constitute a cause for reduction in the NV performance. However, the noise level increases as the vehicle speed increases. Because of this, as is shown in FIG. 5, the duty ratio is set to increase as the vehicle speed increases.

Figure 6:
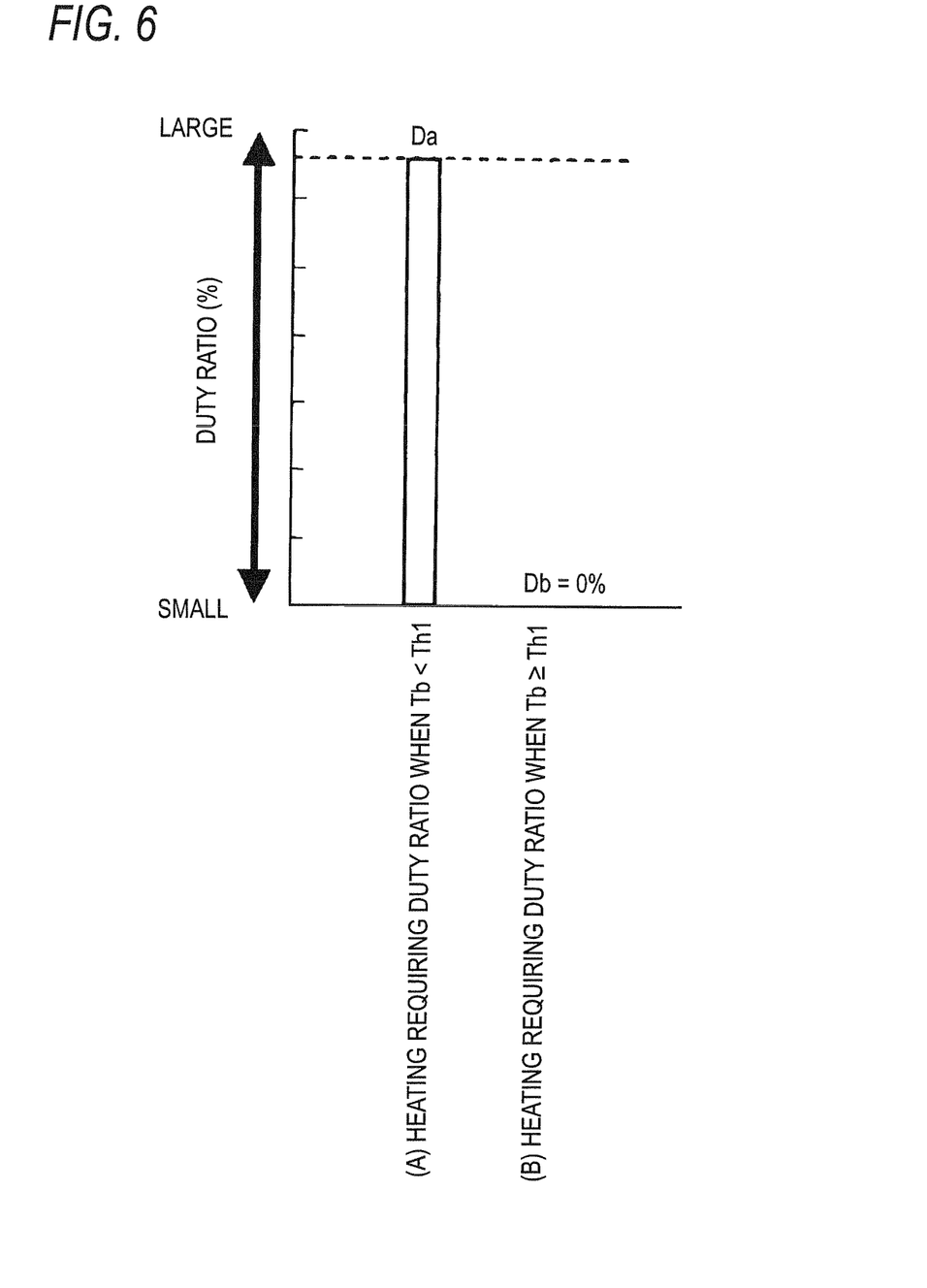
FIG. 6 is a chart showing an example of a heating requiring duty ratio in accordance with a large-small relationship between battery temperature Tb and first threshold Th1.

In addition, the storage unit 123 stores duty ratios in accordance with a large-small relationship between battery temperature Tb and first threshold Th1 (hereinafter, referred to as a "heating requiring duty ratio"). FIG. 6 shows an example of a heating requiring duty ratio in accordance with a large-small relationship between battery temperature Tb and first threshold Th1. As shown in FIG. 6, the heating requiring duty ratio is Da % when the battery temperature Tb is smaller than the first threshold Th1 (Tb<Th1) (A) and is Db % (=0%) when the battery temperature Tb is equal to or larger than the first threshold Th1 (Tb≥Th1) (B). Note that the relationship between the heating requiring duty ratios Da, Db is "Da>Db." In addition, the heating requiring duty ratios do not change depending on mode.

Figure 7:
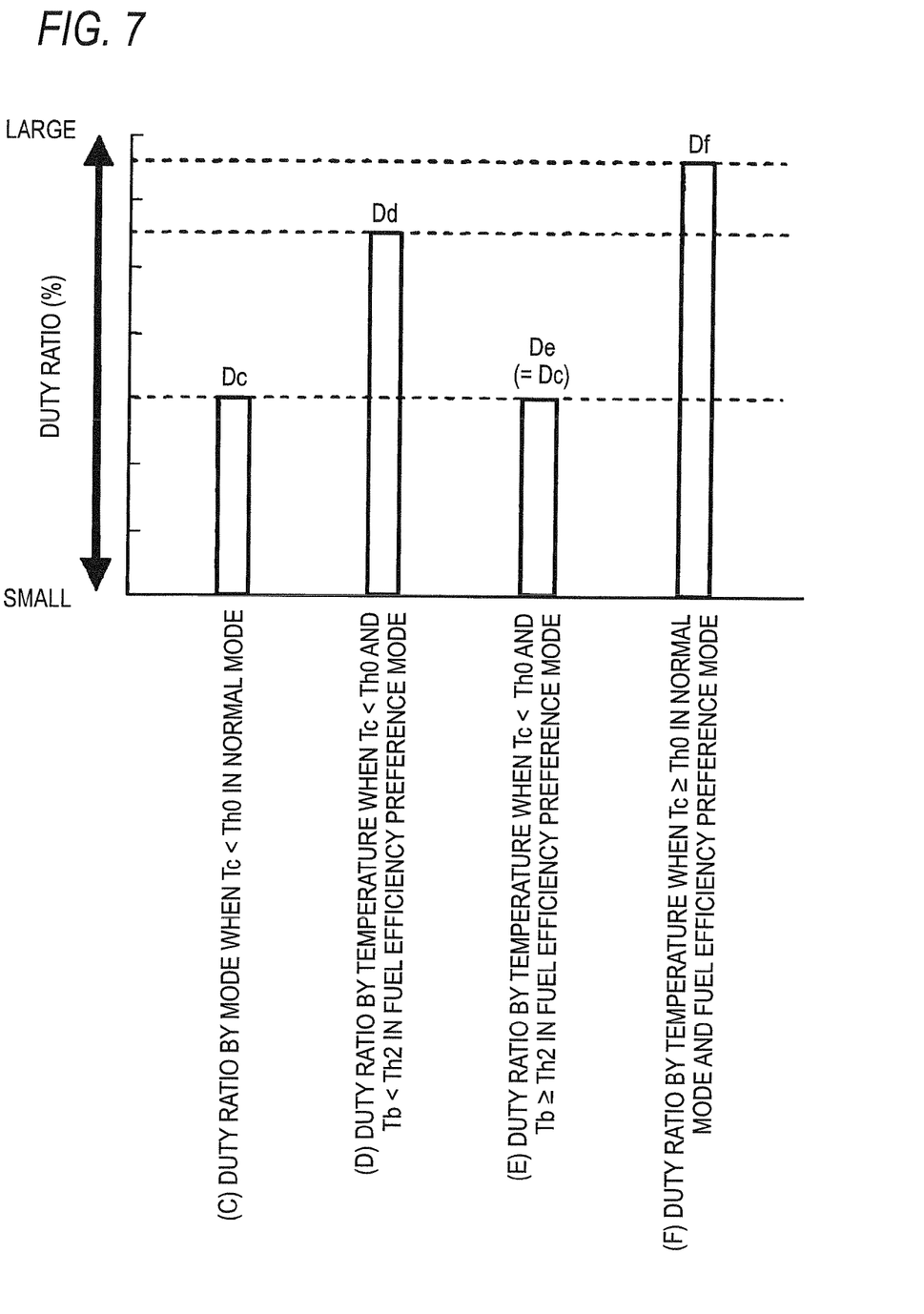
FIG. 7 is a chart showing an example of a duty ratio by mode in accordance with cooling water temperature Tc and battery temperature Tb.

In addition, the storage unit 123 stores duty ratios by mode for the fuel efficiency preference mode and the normal mode in accordance with cooling water temperature Tc and battery temperature Tb (hereinafter, referred to as "duty ratios by mode"). FIG. 7 shows an example of a duty ratio by mode in accordance with cooling water temperature Tc and battery temperature Tb. As shown in FIG. 7, the duty ratio by mode is Dc % when the cooling water temperature Tc is smaller than a predetermined threshold Th0 (Tc<Th0) in the normal mode (C), is Dd % (Dd>Dc) when the cooling temperature Tc is the predetermined threshold Th0 (Tc<Th0) and the battery temperature Tb is smaller than a second threshold (Tb<Th2) in the fuel efficiency preference mode (D), is De % (=Dc %) when the cooling temperature Tc is the predetermined threshold Th0 (Tc<Th0) and the battery temperature Tb is equal to or larger than the second threshold (Tb≥Th2) in the fuel efficiency preference mode (E), and is Df % (Df>Dd) when the cooling temperature Tc is equal to or larger than the predetermined threshold Th0 (Tc≥Th0) in the fuel efficiency preference mode (F). Note that the second threshold Th2 is lower than the first threshold Th1 (Th2<Th1). In this way, the duty ratios by mode in accordance with cooling temperature Tc are set for the normal mode, and the duty ratios by mode in accordance with cooling temperature Tc and battery temperature Tb are set for the fuel efficiency preference mode.

The control unit 125 induces a limit duty ratio corresponding to the vehicle speed detected by the vehicle sensor 119 based on the vehicle/duty ratio map stored in the storage unit 123. Further, the control unit 125 determines the heating requiring duty ratio from the duty ratio by mode based on a signal regarding the mode set which is sent from the command unit 117, a signal signaling the battery temperature Tb which is sent from the battery temperature sensor 105, and a signal signaling the cooling temperature Tc which is sent from the cooling water temperature sensor 121. The control unit 125 controls the electric power supplied to the motor 163 of the induction fan 115 from the auxiliary battery unit 113 based on a lowest duty ratio in the three duty ratios induced, that is, the limit duty ratio, the heating requiring duty ratio and the duty ratio by mode.

Figure 8:
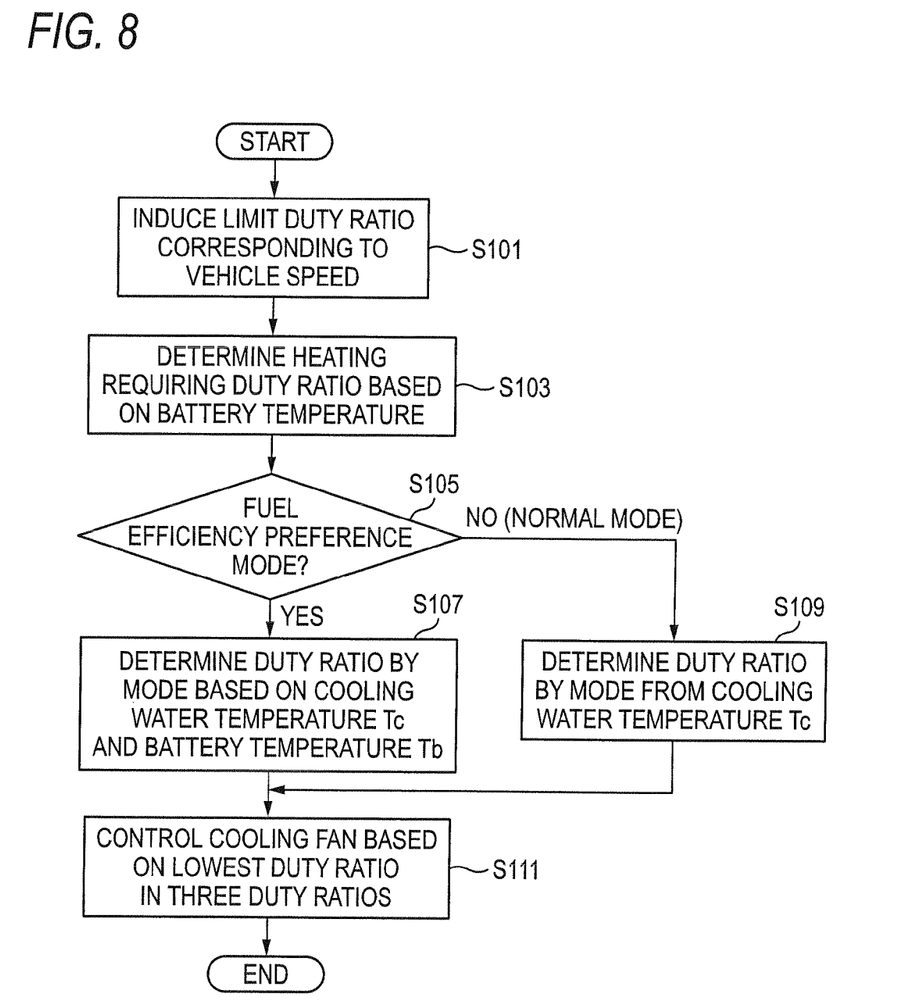
FIG. 8 is a flowchart showing the operation of a control unit fitted on the vehicle according to the embodiment.

FIG. 8 is a flowchart showing the operation of the control unit fitted in the vehicle according to the embodiment. As shown in FIG. 8, the control unit 125 induces a limit duty ratio corresponding to the vehicle speed based on the vehicle speed/duty ratio map (step S101). Next, the control unit 125 determines the heating requiring duty ratio from the others based on the battery temperature Tb (step S103). Next, the control unit 125 determines whether or not the mode to which the vehicle is set is the fuel efficiency preference mode (step S105). When it is determined that the mode to which the vehicle is set is the fuel efficiency preference mode, the flow of operation proceeds to step S107, whereas when the mode to which the vehicle is set is the normal mode, the flow of operation proceeds to step S109.

In step S107, the control unit 125 determines the duty ratio by mode from the others based on the cooling water temperature Tc and the battery temperature Tb. On the other hand, in step S109, the control unit 125 determines the duty ratio by mode from the others based on the cooling water temperature Tc. After step S107 or step S109 is performed, the control unit 125 controls the induction fan 115 based on the lowest duty ratio in the limit duty ratio induced in step S101, the heating requiring duty ratio determined in step S103, and the duty ratio by mode determined in step S107 or S109 (step S111).

Figure 9:
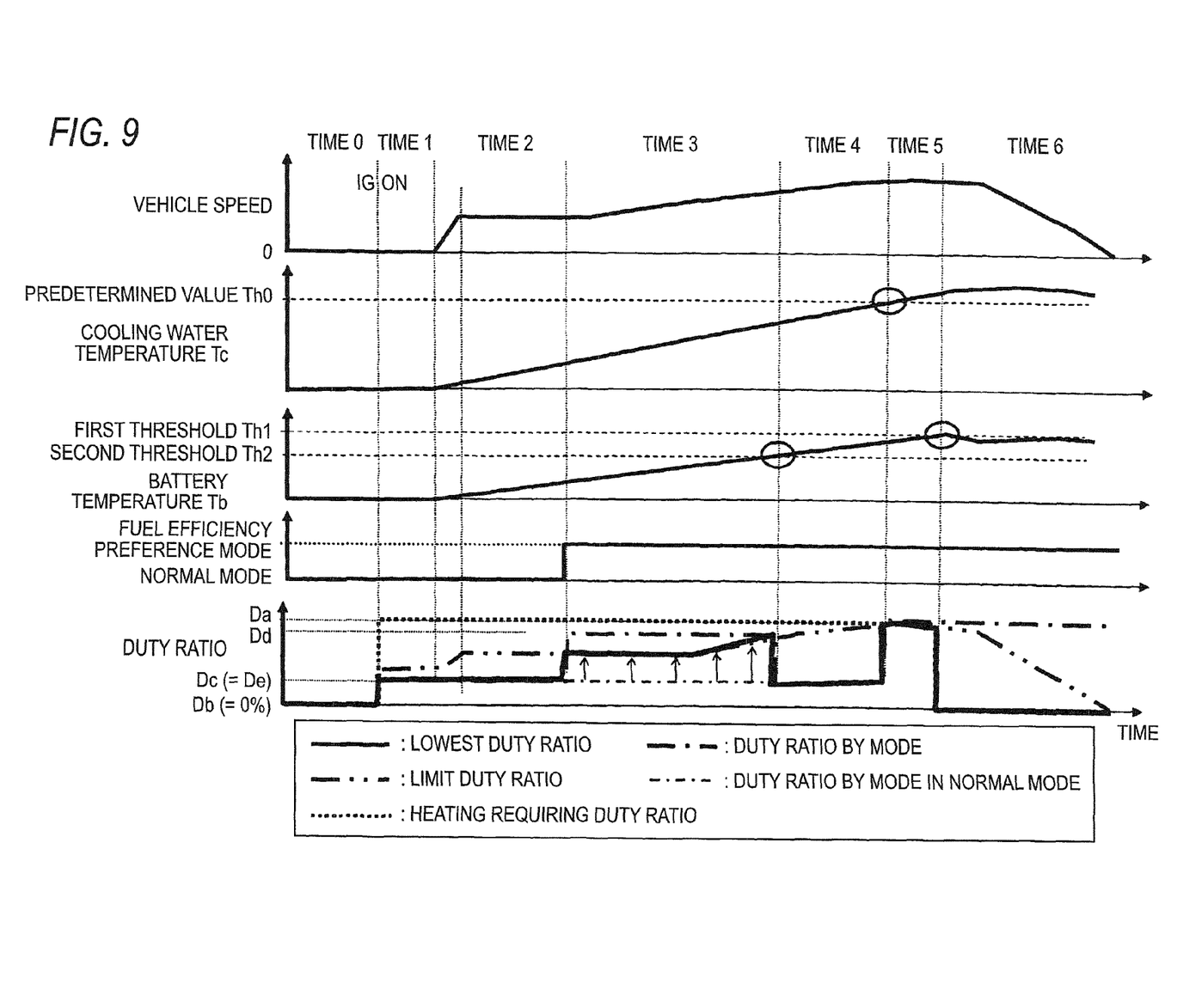
FIG. 9 is a chart showing an example of a change with time of conditions of the vehicle according to the embodiment and individual duty ratios.

FIG. 9 shows an example of a change with time of conditions of the vehicle according to the embodiment and the individual duty ratios. The example shown in FIG. 9 shows the time during which the ignition is in an OFF state (Time 0), the time spent until the vehicle starts running after the ignition is on (IG ON) (Time 1), the time spent until the mode is switched from the normal mode to the fuel efficiency preference mode from when the vehicle starts running (Time 2), the time spent until the battery temperature Tb reaches to the second threshold Th2 (Time 3), the time spent until the cooling water temperature Tc reaches the predetermined value Th0 (Time 4), the time spent until the battery temperature Tb reaches the first threshold Th1 (Time 5), and the time continuing thereafter (Time 6).

In Time 1 and Time 2, the vehicle is set to the normal mode, in which the induction fan 115 is controlled based on the duty ratio by mode which is the lowest in the three duty ratios. After Time 3, the vehicle is set to the fuel efficiency preference mode, and in Time 3, the induction fan 115 is controlled based on the limit duty ratio which is the lowest in the three duty ratios. In case the vehicle is set to the normal mode in Time 3, the lowest duty ratio is the duty ratio by mode. In Time 4, the induction fan 115 is controlled based on the duty ratio by mode which is the lowest in the three duty ratios. In Time 5, the induction fan 115 is controlled based on the limit duty ratio which is the lowest in the three duty ratios. In Time 6, the induction fan 115 is controlled based on the heating requiring duty ratio which is the lowest in the three duty ratios.

Thus, as has been described heretofore, in the vehicle which installs the battery unit heating apparatus of the embodiment, in such a state that the vehicle is set to the fuel efficiency preference mode and when the battery temperature Tb is lower than the second threshold Th2, as indicated by arrows directed upwards in FIG. 9, the duty ratio is increased higher than when the vehicle is set to the normal mode. Since the drawing force of the induction fan 115 increases as the duty ratio increases, much air within the space 155 in the passenger compartment which is heated by the air conditioner 109 is drawn into the induction duct 107 and the unit 151 which includes the battery unit 101. Consequently, the battery unit 101 is heated to the desired temperature within a shorter period of time than when in the normal mode by the air so drawn in. As a result, the battery unit can supply the electric motor with electric power required for the driving of the vehicle under the fuel efficiency preference mode.

While the invention has been described in detail or by reference to the specific embodiment, it is obvious to those skilled in the art to which the invention pertains that various alterations or modifications can be made to the invention without departing from the spirit and scope of the invention.

This patent application is based on Japanese Patent Application (No. 2008-308691) filed on Dec. 3, 2008, the contents of which are to be incorporated herein by reference.

DESCRIPTION OF REFERENCE CHARACTERS AND NUMERALS

E internal combustion engine
M electric motor
T transmission mechanism
W drive wheel
101 battery unit
103 inverter (INV)
105 battery temperature sensor 107 induction duct
109 air conditioner
111 DC-DC converter
113 auxiliary battery unit
115 induction fan
161 fan
163 motor
117 command unit
119 vehicle speed sensor
121 cooling water temperature sensor
123 storage unit
151 unit

The invention claimed is:

1. A battery unit heating apparatus installed in a vehicle which is driven by power from an internal combustion engine and an electric motor, the electric motor being driven by a battery unit as a power supply, the vehicle having a first mode and a second mode of differing drive ratios between the internal combustion engine and the electric motor, the first mode being a state where the vehicle receives more power from the electric motor than from the internal combustion engine, the heating apparatus comprising:
   an induction fan configured to variably draw in air from outside of the battery unit into the battery unit;
   an induction control unit configured to control the rotation speed of the induction fan; and
   a vehicle speed detection unit for detecting a running speed of the vehicle,
   wherein when a temperature of the battery unit is lower than a first predetermined value and when the vehicle is set to the first mode, the induction control unit is configured to control the induction fan so as to generate a drawing force larger than a drawing force provided when the vehicle is in the second mode in which the internal combustion engine is employed more positively than the electric motor, and
   wherein the induction control unit is configured to control the induction fan so as to provide a drawing force corresponding to the running speed of the vehicle detected by the vehicle speed detection unit based on a map in which different drawing forces are set in accordance with different running speeds of the vehicle even in the event that the vehicle is set to either of the first and second modes.

2. A battery unit heating apparatus according to claim 1, wherein
   when the temperature of the battery unit is equal to or higher than a second predetermined value, the induction control unit is configured to control the rotation speed of the induction fan so as not to draw in air into the battery unit.

3. A battery unit heating apparatus according to claim 2, wherein
   when the temperature of the battery unit is equal to or higher than the first predetermined value and is less than the second predetermined value and when the vehicle is set to the first mode, the induction control unit is configured to control the rotation speed of the induction fan so as to generate a drawing force equal to the drawing force provided when the vehicle is in the second mode.

4. A battery unit heating apparatus according to claim 1, further comprising:
   a passenger compartment heating unit selectively heating a passenger compartment of the vehicle by heat generated in the internal combustion engine, wherein
   the induction fan is configured to draw in air to the battery unit from the passenger compartment of the vehicle.

5. A battery unit heating apparatus according to claim 4, further comprising:
   a cooling water temperature detection unit for detecting a temperature of cooling water of the internal combustion engine;
   wherein
   when the temperature of the cooling water of the internal combustion engine detected by the cooling water temperature detection unit is equal to or higher than a predetermined value, the induction control unit is configured to control the induction unit so as to provide a drawing force corresponding to the running speed of the vehicle detected by the vehicle speed detection unit based on a map in which different drawing forces are set in accordance with different running speeds of the vehicle even in the event that the vehicle is set to either of the first and second modes.

6. A battery unit heating apparatus according to claim 1, wherein
   the first mode or the second mode is set through an operation of the driver of the vehicle.

7. A battery unit heating apparatus according to claim 1, wherein
   the internal combustion engine has a drive shaft directly connected to a drive shaft of the electric motor.

* * * * *